（12） United States Patent
Ling et al.

(10) Patent No.: US 9,809,231 B2
(45) Date of Patent: Nov. 7, 2017

(54) SYSTEM AND METHOD FOR EXECUTING GESTURE BASED CONTROL OF A VEHICLE SYSTEM

(71) Applicant: Honda Motor Co., Ltd., Tokyo (JP)

(72) Inventors: Calvin Ling, Austin, TX (US); Michael Nehmad, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 14/924,765

(22) Filed: Oct. 28, 2015

(65) Prior Publication Data
US 2017/0120930 A1    May 4, 2017

(51) Int. Cl.
B60R 16/023    (2006.01)
B60W 50/10    (2012.01)
B60K 35/00    (2006.01)

(52) U.S. Cl.
CPC ............. B60W 50/10 (2013.01); B60K 35/00 (2013.01); B60R 16/023 (2013.01); B60K 2350/1052 (2013.01)

(58) Field of Classification Search
None
See application file for complete search history.

(56) References Cited

U.S. PATENT DOCUMENTS

| 6,353,396 | B1 | 3/2002 | Atlas |
| 2009/0326406 | A1 | 12/2009 | Tan et al. |
| 2011/0036191 | A1* | 2/2011 | Wolterman ............. F16D 48/06 74/473.12 |
| 2013/0325151 | A1 | 12/2013 | Wadia |
| 2014/0240103 | A1* | 8/2014 | Lake ...................... G08C 17/02 340/12.5 |
| 2014/0267114 | A1* | 9/2014 | Lisseman .............. G06F 3/0488 345/173 |
| 2015/0057770 | A1 | 2/2015 | Bailey et al. |
| 2015/0169074 | A1* | 6/2015 | Ataee ...................... G06F 3/017 345/156 |
| 2015/0234470 | A1* | 8/2015 | Rosenstock ............. G06F 3/017 701/36 |

(Continued)

FOREIGN PATENT DOCUMENTS

| FR | WO2014049213 A1 * | 9/2012 | ............. B60K 35/00 |
| WO | 2015033327 | 3/2015 | |
| WO | 2015090810 | 6/2015 | |

OTHER PUBLICATIONS

Article: Lecher, C.: "Wristband Tracks Your Muscle Movements for Super-Precise Gesture Controls Swipe the Air to Pause. Wave to Fly Drone", Popular Science, posted Feb. 25, 2013, http://www.popsci.com/gadgets/article/201302/gesturecontrolal-lyourgadgetsawesomewristband.

Primary Examiner — Mussa A Shaawat
Assistant Examiner — Abdhesh Jha
(74) Attorney, Agent, or Firm — Rankin, Hill & Clark LLP

(57) ABSTRACT

A method and system for executing gesture based control of a vehicle system that include receiving at least one signal that pertains to at least one muscle movement from sensors disposed within a gear shift knob. The method and system also include determining at least one gesture based on the at least one signal. Additionally, the method and system include determining an interaction command with the vehicle system based on the at least one gesture. The method and system further include outputting the interaction command to the vehicle system.

20 Claims, 6 Drawing Sheets

(56) References Cited

U.S. PATENT DOCUMENTS

2016/0090104 A1* 3/2016 Diaz-Jimenez ....... B60W 50/10
701/70
2016/0132126 A1* 5/2016 van Laack ............ G06F 3/0304
345/156

* cited by examiner

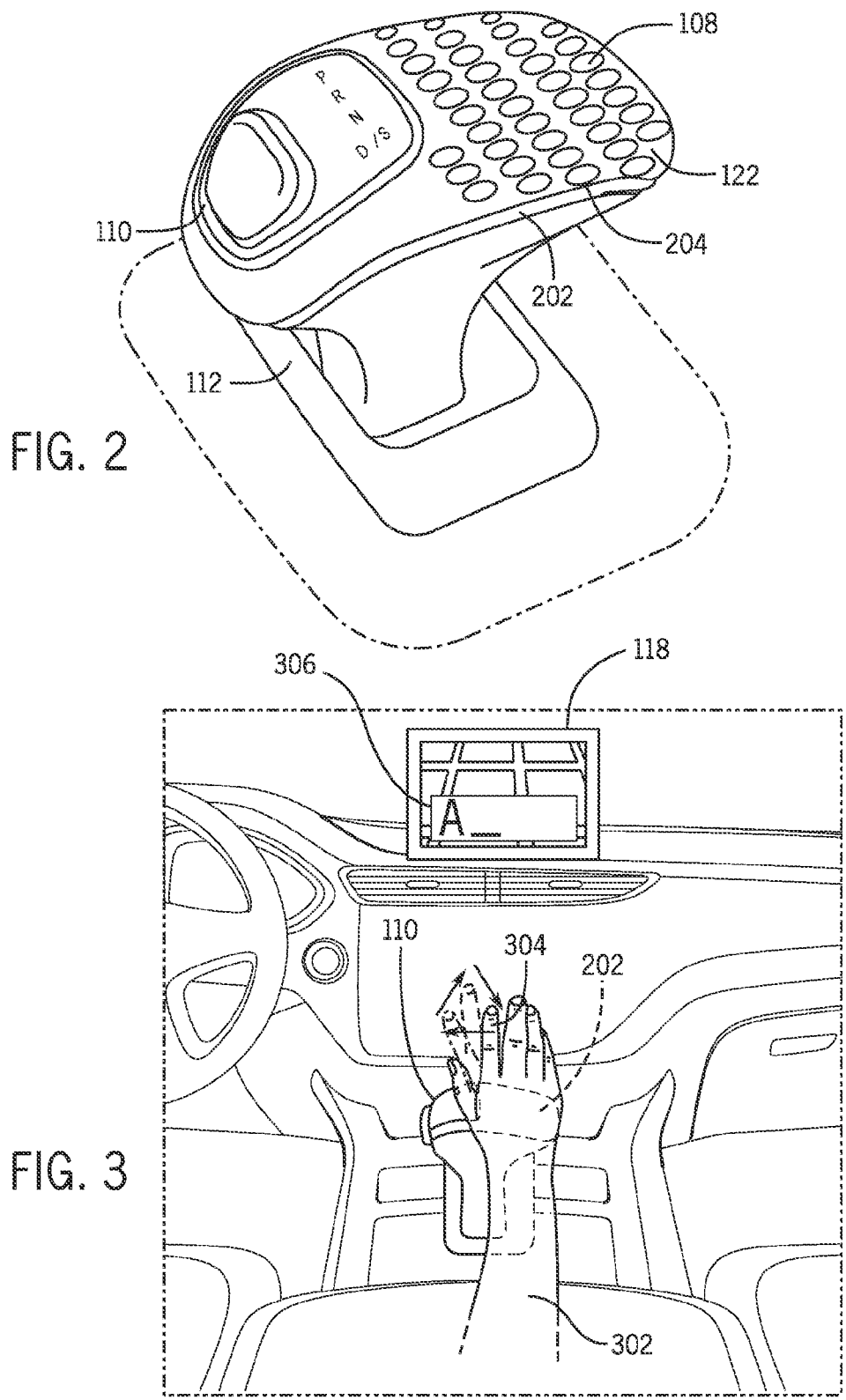

SYSTEM AND METHOD FOR EXECUTING GESTURE BASED CONTROL OF A VEHICLE SYSTEM

BACKGROUND

Generally, in order to utilize and control vehicle system features, drivers have must physically interact with vehicle system controls. For example, to utilize a vehicle audio system, drivers of vehicles have to physically interact with physical controls such as knobs, dials, and switches provided on a vehicle console. Alternatively, vehicle systems may include user interface controls that allow drivers to interact with the vehicle systems via a touchscreen displaying the user interface. However, it can be cumbersome, distracting, and/or inconvenient for drivers to reach in a specific direction of physical controls or user interface controls on touchscreens to interact with vehicle systems.

Some camera based systems have been introduced that allow drivers to perform gestures to interact with the vehicle systems. However, these systems often have issues correctly determining a driver gestures. For example, some factors such as poor lighting and/or obstruction of the camera lens can cause these camera based system to incorrectly identify driver gestures. These issues can require a driver to reenact gestures repeatedly or resume to utilizing physical or user interface controls in order to interact with vehicle systems causing further distraction and inconvenience for the drivers.

BRIEF DESCRIPTION

According to one aspect, a computer-implemented method for executing gesture based control of a vehicle system that includes receiving at least one signal that pertains to at least one muscle movement from sensors disposed within a gear shift knob. The method also includes determining at least one gesture based on the at least one signal. Additionally, the method includes determining an interaction command with the vehicle system based on the at least one gesture. The method further includes outputting the interaction command to the vehicle system. The interaction command is outputted to the vehicle system to execute the interaction command.

According to a further aspect, a system for executing gesture based control of a vehicle system that includes a gesture control application that is executed on an electronic control unit of a vehicle. The system also includes a signal reception module that is included as a module of the gesture control application that receives at least one signal that pertains to at least one muscle movement from sensors disposed within a gear shift knob. The system additionally includes a gesture determinant module that is included as a module of the gesture control application that determines at least one gesture based on the at least one signal. The system further includes a command determinant module that is included as a module of the gesture control application that determines an interaction command with the vehicle system based on the at least one gesture. Additionally, the system includes a command output module that is included as a module of the gesture control application that outputs the interaction command to the vehicle system. The interaction command is outputted by the command output module to the vehicle system to execute the interaction command.

According to still another aspect, a computer readable storage medium storing instructions that, when executed by a processor, perform actions, including receiving at least one signal that pertains to at least one muscle movement from sensors disposed within a gear shift knob. The instructions also include determining at least one gesture based on the at least one signal. Additionally, the instructions include determining an interaction command with the vehicle system based on the at least one gesture. The instructions further include outputting the interaction command to the vehicle system. The interaction command is outputted to the vehicle system to execute the interaction command.

BRIEF DESCRIPTION OF THE DRAWINGS

FIG. 2 is an illustrative view of an exemplary shift lever from the operating environment of FIG. 1 according to an exemplary embodiment;

FIG. 3 is an illustrative example of executing gesture based control of the vehicle system according to an exemplary embodiment;

DETAILED DESCRIPTION

Figure 1:
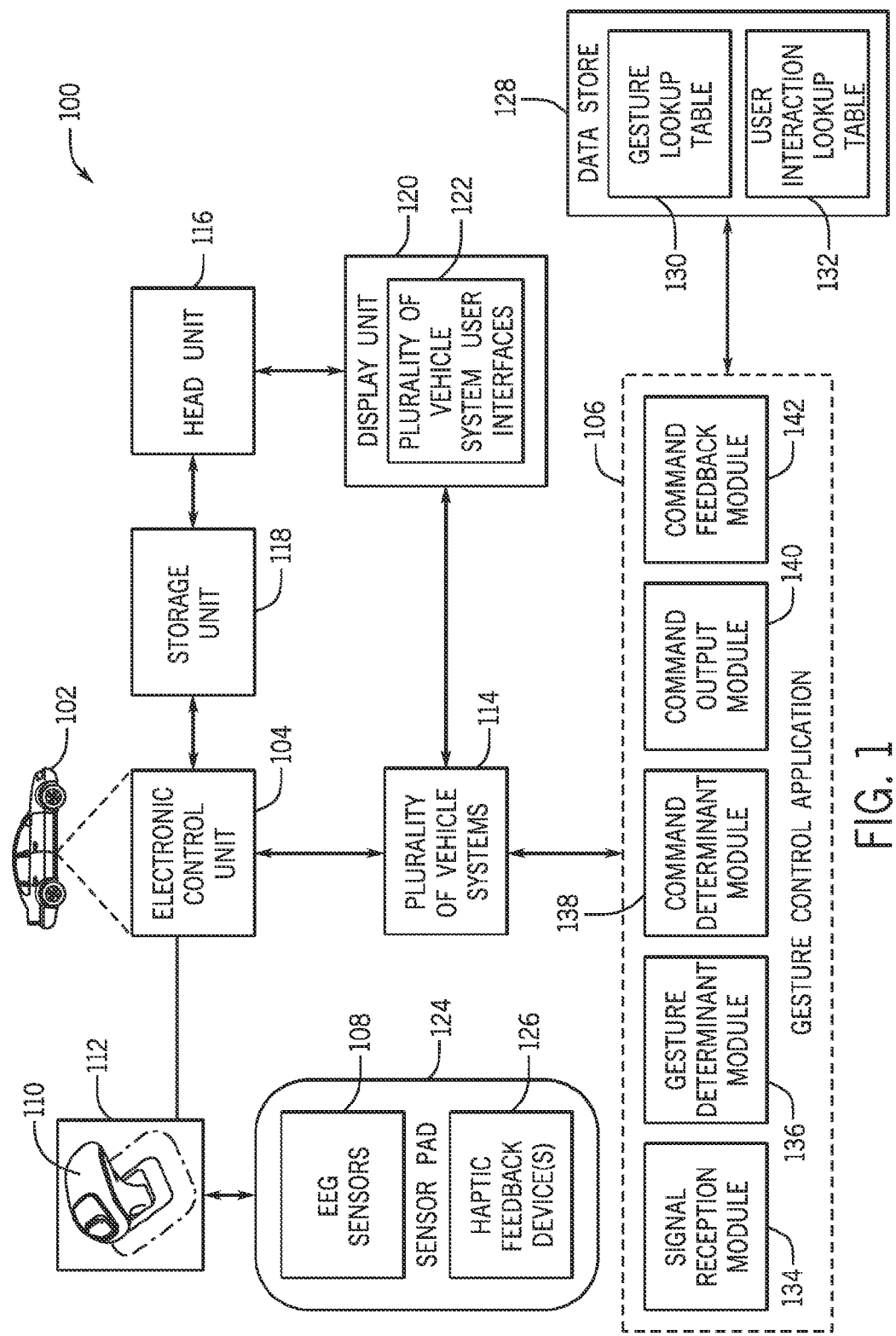
FIG. 1 is a schematic view of an operating environment for executing gesture based control of a vehicle system according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an operating environment for executing gesture based control of a vehicle system according to an exemplary embodiment. The components of the environment 100, as well as the components of other systems, hardware architectures, and software architectures discussed herein, can be combined, omitted, or organized into different architectures for various embodiments.

Generally, the environment 100 includes a vehicle 102 with an electronic control unit 104 (ECU) that executes or accesses a gesture control application 106. As discussed in more detail below, the gesture control application 106 can utilize a plurality of sensors (shown in FIG. 2) that are disposed on a gear shift knob 110 of a shift lever 112 to determine if one or more gestures provided by a driver of the vehicle 102 can be used to interact with a particular vehicle system of the plurality of vehicle systems 114. Within this disclosure, electromyography (EEG) sensors 108 (included within the plurality of sensors) will be discussed in detail to provide signals that can be utilized by the gesture control application 106 to determine gestures provided by the driver of the vehicle 102. However, the system and method discussed herein can be implemented with various additional or alternate types of sensors that can be included as part of the plurality of sensors.

In an exemplary embodiment, the gesture control application 106 can analyze one or more predetermined gestures provided by the driver of the vehicle 102 to interact with the plurality of vehicle systems 114 in the same manner as if the driver were physically manipulating knobs, dials, and/or user interface icons to interact with the plurality of vehicle systems 114. More specifically, the gesture control application 106 enables the driver of the vehicle 102 to provide one or more predetermined hand gestures (with the user of the driver's full hand), finger gestures, and/or thumb gestures that can be determined as interaction commands. The interaction commands can be used to manipulate user input functions to provide inputs to a particular vehicle system of the plurality of vehicle systems 114 that is being utilized by the driver of the vehicle 102.

The predetermined hand gestures can include, but are not limited to inputting/pushing, pinching, writing, scrolling, sliding, and turning gestures for interacting with the plurality of vehicle systems 114 by manipulating functions of the one or more vehicle systems of the plurality of vehicle systems 114. In other words, each vehicle system of the plurality of vehicle systems 114 can include a set of one or more predetermined gestures that can be utilized to interact with that particular vehicle system. As an illustrative example, a navigation system can include a set of predetermined gestures that can include predetermined writing gestures that can include the driver extending his or her finger and making a handwriting motion that can be used to mimic handwriting in a destination address. As another illustrative example, an audio system on the other hand may not include predetermined writing gestures, but may instead include predetermined turning gestures that can include the driver pinching his thumb and index finger towards one another to mimic turning a volume control turn knob.

With reference to the components of the vehicle 102, the ECU 104 includes internal processing memory (not shown), an interface circuit (not shown), and bus lines (not shown) for transferring data, sending commands, and communicating with the plurality of vehicle systems 114. The ECU 104 can also include a communications device (not shown) for sending data internally in the vehicle 102 and externally to connected devices. The communication device included within the ECU 104 is capable of providing wired or wireless computer communications utilizing various protocols to send/receive electronic signals internally to/from the plurality of sensors, the plurality of vehicle systems 114, and/or a head unit 116 of the vehicle 102. Additionally, the communication device of the ECU 104 is operably connected for internal computer communication via a bus (e.g., a Controller Area Network (CAN) or a Local Interconnect Network (LIN) protocol bus) to facilitate data input and output between the ECU 104, the plurality of sensors, the plurality of vehicle systems 114, and/or the head unit 116.

The ECU 104 can be operably connected to a storage unit 118 that can store one or more operating systems, applications, associated operating system data, user interfaces, and the like that are executed by the ECU 104. In an exemplary embodiment, the storage unit 118 can store the gesture control application 106 to be executed by the ECU 104. The ECU 104 can also be operably connected to the head unit 116 to provide a human machine interface (HMI) that can be associated to one or more operating systems, applications, associated operating system data, and the like.

In one embodiment, the head unit 116 can be located at a front portion of the interior of the vehicle 102. The head unit 116 can be connected to the storage unit 118 and can access the one or more applications, and operating systems that can include HMIs in the form of one or more user interfaces that can be presented to the driver of the vehicle 102 via a display unit 120. In particular, the display unit 120 can be utilized by the head unit 116 and/or the ECU 104 to present the one or more user interfaces. The head unit 116 can also include one or more vehicle system head unit devices (not shown) (e.g., audio system panel, HVAC system panel, haptic devices (not shown) that are utilized to provide a HMI to the driver of the vehicle 102 in the form of buttons, switches, user interfaces, knobs, handles, and the like.

The display unit 120 can be a flat panel display that can include a liquid crystal display (LCD) device. The display unit 120 can be configured in a variety of form factors, shapes, sizes, designs, and/or configurations. For example, the display unit 120 may be configured in a wide or ultra wide format. In an alternate embodiment, the display unit 120 can include a heads up display that projects the display unit 120 upon the windshield of the vehicle 102.

In one embodiment, the display unit 120 can include a touch screen display (not shown) that can receive touch based user inputs from a user (e.g., the driver) that can apply to one or more user interfaces that are presented via the display unit 120. In some embodiments, in lieu of or in addition to the touch screen display, the head unit 116 can also be operably connected to one or more user input devices (individual user input devices not shown) that can be used by the driver to provide inputs to one or more user interfaces presented on the display unit 120. The one or more user input devices can include but are not limited to the touch screen, steering wheel controls, a joystick knob, a turn knob, shift lever controls, gear shift buttons, and the like.

The plurality of vehicle systems 114 can include (individual vehicle systems not shown), but are not limited to, a vehicle navigation system, a vehicle lighting system, a vehicle HVAC system, a vehicle audio system, a vehicle video system, a vehicle infotainment system, a vehicle telecommunications system, and the like. As discussed, the gesture control application 106 can communicate with the plurality of vehicle systems 114 to manipulate, adjust, input, and/or output one or more functions based on the gesture provided by the driver of the vehicle 102 that correspond to interaction commands that are executed by the plurality of vehicle systems 114.

In one embodiment, the plurality of vehicle systems 114 can include a plurality of vehicle system user interfaces 122. The plurality of vehicle system user interfaces 122 can be executed by the ECU 104 via the head unit 116 in order to be presented via the display unit 120 as HMIs of the plurality of vehicle systems 114. More specifically, the driver of the vehicle 102 can utilize the one or more user input devices that are operably connected to the head unit 116 to select a respective user interface of the plurality of vehicle system user interfaces 122 to interact with a respective vehicle system of the plurality of vehicle systems 114. For example, the driver can use the touch screen display to select an audio system user interface to utilize the audio system.

Each respective vehicle system user interface of the plurality of vehicle system user interfaces 122 can include one or more user input functions that include, but are not limited to, one or more user input icons (e.g., buttons), one or more user input turn knobs, one or more user input text boxes, one or more user input radio buttons, one or more user input drop down bars, and/or one or more scroll bars. For example, the audio system user interface can include one or more user input functions in the form of user input icons and one or more user input turn knobs that can be used by the driver of the vehicle 102 to interact with the audio system to power ON and OFF the system, change the system mode, and/or change the volume of the audio system. Similarly, a navigation system user interface can include one or more user input functions in the form of text boxes that can be used by the driver of the vehicle 102 to input destination addresses, points of interest, and the like. As discussed, the gesture control application 106 can utilize the one or more gestures provided by the driver of the vehicle 102 to interact with the one or more user input functions that are included as part of the plurality of vehicle system user interfaces 122.

The shift lever 112 and the plurality of sensors that can be disposed on the shift lever 112 will now be discussed in more detail. FIG. 2 is an illustrative view of an exemplary shift lever 112 from the operating environment of FIG. 1. In the embodiment shown, the shift lever 112 can be part of an automatic transmission system (not shown) of the vehicle 102 and can be used by the driver to select an automatic transmission mode of the automatic transmission unit. In an another embodiment, the shift lever 112 can be part of a manual transmission system (not shown) of the vehicle 102 and can be used by the driver to select a gear of the manual transmission unit.

In the exemplary embodiment shown in FIG. 2, the gear shift knob 110 can be disposed on a top portion of the shift lever 112. The gear shift knob 110 can include a hand resting portion 202 that can be used by the driver to rest his or her hand while he or she drives the vehicle 102. With reference to FIGS. 1 and 2, the hand resting portion 202 can include a sensor pad 124 that includes the plurality of sensors 204. In particular the sensor pad 124 can be mechanically coupled to the gear shift knob 110 at an area of the hand resting portion 202 that comes in contact with the driver's hand, wrist, and/or forearm to sense muscle movements in the driver's hand, wrist and/or forearm that occur when the driver positions (e.g., in order to rest) his or her hand, wrist, and/or forearm on the hand resting portion 202 of the gear shift knob 110.

In some embodiments, the sensor pad 124 can be included under a layer of covering/paneling (e.g., leather covering/wood grain paneling) that is provided on the hand resting portion 202 so that it is not visible to the driver and/or passenger(s) within the vehicle 102. In one embodiment, (as represented in FIG. 2) the sensor pad 124 can include the plurality of sensors 204 that can be included within an array pattern to ensure that various signals can be captured from the placement of the driver's hand, wrist, and/or forearm on the hand resting portion 202. However, it is to be appreciated that the plurality of sensors 204 that can be positioned/disposed in various types of patterns and/or locations within the hand resting portion 202 to capture the various signals.

In an exemplary embodiment, the plurality of sensors can include, but are not limited to the EEG sensors 108. In one or more embodiments, the EEG sensors 108 can be used to evaluate and record electrical activity produced by the muscles in and around the driver's hand, wrist, and/or forearm. The EEG sensors 108 can detect electric signals that are generated by muscle movements when the muscles are electrically or neurologically activated during movement. Therefore, the EEG sensors 108 are capable of determining electrical signals from the surface of the driver's skin included at the driver's hand, wrist, and/or forearm that is positioned (e.g., resting) on one or more portions of the sensor pad 124 of the hand resting portion 202. Moreover, the EEG sensors located at various specific portions of the sensor pad 124 of the hand resting portion 202 can include multiple electrodes that can determine a difference in voltage between one another to provide signals pertaining to muscle movements. Upon sensing electrical signals that are generated by movements of muscles in and around the driver's hand, wrist, and/or forearm, the EEG sensors can provide one or more signals to the ECU 104 that are received and further interpreted by the gesture control application 106.

Some non-limiting illustrative examples of sensing muscle movements will now be discussed. In one example, when the driver positions his wrist and forearm on the hand resting portion 202 of the gear shift knob 110 and provides a turning gesture with his or her fingers and thumb, the EEG sensors 108 can sense electrical signals provided by flexor muscles that are located on the palm side of the driver's forearm that connect to flexor tendons that attach to each of the driver's fingers. Therefore, when the driver performs a gripping or grasping motion with his or her fingers, specific flexor muscles are moved and provide corresponding electrical signals that are sensed by the EEG sensors 108.

In another example, when the driver provides a finger pointing gesture, the EEG sensors 108 can additionally sense electrical signals provided by respective extender muscles located at the lower side of the driver's wrist that move based on when a respective finger is extended. Therefore, when the driver extends one or more fingers, specific extender muscles are moved and provide electrical signals that are sensed by the EEG sensors 108.

In a further example, wrist movements can also be sensed by the EEG sensors 108. For example, when the driver provides a gesture and the driver's wrist joint flexes and extends and/or moves from side to side on the hand resting portion 202, the EEG sensors 108 can sense changes in electrical signals provided by muscles from one portion of the sensor pad 124 to another portion of the sensor pad 124 as the driver moves his or her wrist from one side to another (e.g., to point towards a specific input icon presented at a specific portion of the display unit 120). It is to be appreciated that many other muscle movements can be sensed by the EEG sensors 108 that can correspond to various types of hand, finger, and/or thumb movements of the driver of the vehicle 102.

As discussed in more detail below, upon receiving the one or more signals from the EEG sensors 108, the one or more signals can be interpreted by the gesture control application 106 to determine specific muscle movements that can be translated into one or more specific hand, finger, and/or thumb movements that can be combined to determine one or more gestures. In other words, when the driver of the vehicle 102 uses his or her fingers and/or thumb to make specific predetermined gestures, the gesture control application 106 can determine muscles within the driver's hand, wrist, and/or forearm that are electrically or neurologically activated to produce corresponding signals that can be evaluated to determine gestures that can be utilized to provide an interaction command with the vehicle system that is being utilized by the driver of the vehicle 102.

In one or more embodiments, in addition to the plurality of sensors 204, the sensor pad 124 can include one or more haptic feedback devices 126 disposed around or amongst the plurality of sensors. The haptic feedback device(s) 126 can provide tactile feedback in the form of vibrations that can be felt by the driver as he or she positions his or her hand, wrist, and/or forearm on the hand resting portion 202 of the gear shift knob 110.

In one embodiment, in addition to providing vibrational feedback to the driver, the haptic feedback device(s) 126 can provide force feedback to the driver. The force feedback can provide the driver with one or more feedback sensations that are consistent with manipulating a virtual object (e.g., a user interface icon/button, a user interface turn knob) that the driver feels as the driver positions his or her hand, wrist, and/or forearm on the hand resting portion 202 of the gear shift knob 110. As described in more detail below, the gesture control application 106 can utilize the haptic feedback device(s) 126 to provide the driver of the vehicle 102 with haptic (vibrational or force) feedback during various circumstances. For example, the gesture control application 106 can send one or more actuation signals to the haptic feedback device(s) to provide haptic feedback to the driver upon receiving a confirmation signal from the vehicle system that is being utilized by the driver to confirm that the interaction that corresponds to the gesture provided by the driver is taking place or has taken place.

In an exemplary embodiment, the environment 100 additionally includes a data store 128 that can be accessed by the gesture control application 106. In one embodiment, the data store 128 can consist of a relational database that includes one or more data tables (e.g., database tables) that can be accessed by one or more applications executed on the head unit 116 to store and/or retrieve one or more database records. The one or more database records can contain data that is retrieved and applied by the one or more applications within the vehicle 102 including the gesture control application 106.

In an exemplary embodiment, the data store 128 can be hosted on the storage unit 118. More specifically, the storage unit 118 can include a database server computing program that can provide database services to the ECU 104 the head unit 116, one or more applications, one or more operating systems, etc. within the vehicle 102. In an alternate embodiment, the data store 128 can be hosted externally from the vehicle 102 on an external server infrastructure (not shown) that can include one or more database servers, web servers, data servers, domain controllers, backup servers, etc.

As described in more detail below, in an exemplary embodiment, the gesture control application 106 can access the data store 128 in order to query records that exist on a gesture lookup table 130 to translate the driver's muscle movements sensed by the EEG sensors 108 into one or more gestural attributes that can be combined to determine one or more gestures. Additionally, the gesture control application 106 can access the data store 128 in order to query records that exist on a user interaction lookup table 132 to translate one or more gestures into one or more user interactions that apply to the vehicle system that is utilized by the driver (e.g., the vehicle system user interface being presented to the driver via the display unit 120). In an exemplary embodiment, the gesture lookup table 130 and the user interaction lookup table 132 can include a collection of related data held in a structured format within the data store 128. In some embodiments, the gesture lookup table 130 and/or the user interaction lookup table 132 can include records that can reside within rows and columns of the tables.

In one embodiment, each record of the gesture lookup table 130 can contain one or more predetermined coded values that are attributed to the EEG signals that correspond to the movement of specific muscles in the driver's hand, wrist, and/or forearm. Each record can also contain a plurality of gestural attribute values that are attributed to a type, direction, degree, of gestural hand, finger, and/or thumb movement that is associated to the predetermined coded values that correspond to the specific muscle movements.

As discussed in more detail below, upon receiving one or more signals from the EEG sensors 108 that correspond to sensed muscle movements as the driver positions his hand, wrist, and/or forearm on the hand resting portion 202 of the gear shift knob 110, the gesture control application 106 can convert one or more sensed muscle movements into the one or more predetermined coded values and can access the gesture lookup table 130 to translate the one or more predetermined coded values to the plurality of gestural attribute values. Upon determining the plurality of gestural attribute values, the gesture control application 106 can then combine the each of the gestural attribute values of the plurality of gestural attribute values to determine (complete) gestures. The gesture control application 106 can then determine respective gesture codes based on the plurality of gestural attribute values that can correspond to specific gestures. The gesture codes can be used to determine user interactions if the applicant determines that the gesture codes correspond to predetermined gestures that can be used to interact with a particular vehicle system that is being currently utilized.

In one embodiment, each record in the user interaction lookup table can include a vehicle system designation that designates which vehicle system of the plurality of vehicle systems 114 the record corresponds to. In one embodiment, the vehicle system designation can include a three character abbreviation that designates each vehicle system. For example, the vehicle system designation for the audio system can include AUD. Similarly, the vehicle system designation for the navigation system can include NAV.

Each record can also include a gesture code that is associated to a specific gesture that can be utilized to interact with the respective vehicle system. Additionally each record in the user interaction lookup table 132 can also include a respective vehicle system interaction command that is associated with each gesture code within the record. As discussed in more detail below, upon converting gestures into gesture codes as discussed above, and identifying the vehicle system that is being utilized by the driver, the gesture control application 106 can perform a query on the user interaction lookup table 132 to determine one or more interaction commands that are to be executed by the vehicle system that is currently being utilized in the vehicle 102 based on the driver's gesture.

II. The Gesture Control Application

The gesture control application 106 and its specific functionality will now be described in more detail according to an exemplary embodiment. In an exemplary embodiment, the gesture control application 106 can be stored on the storage unit 118 and executed by the ECU 104 and/or the head unit 116. In additional embodiments, the gesture control application 106 can be stored on memory of an external device (not shown) (e.g., a remote server) and executed by the ECU 104 and/or the head unit 116 of the vehicle 102 via a computer communication medium (e.g., remote network connection) between the ECU 104 and/or the head unit 116 and the external device.

In an exemplary embodiment, the gesture control application 106 can include a signal reception module 134, a gesture determinant module 136, a command determinant module 138, a command output module 140, and a command feedback module 142. In an exemplary embodiment, the signal reception module 134 can receive one or more EEG signals from the EEG sensors 108 disposed on the sensor pad 124 when the driver places his or her hand, wrist, and/or forearm on the hand resting portion 202 of the gear shift knob 110. In other words, the signal reception module 134 can receive one or more EEG signals from the EEG sensors 108 based on muscle movements that occur within the driver's hand, wrist, and/or forearm when the driver provides one or more gestures to interact with a respective vehicle system.

In one embodiment, upon receiving the one or more EEG signals from the EEG sensors 108, the signal reception module 134 can interpret the one or more EEG signals to identify one or more muscle movements that take place within the driver's hand, wrist, and/or forearm. In addition, the signal reception module 134 can interpret one or more specific attributes of the one or more muscle movements that take place (e.g., type of movement, duration of movement, and the like). In one or more embodiments, the storage unit 118 can include a plurality of predetermined codes values that each correspond to EEG signals that can be sensed by the EEG sensors 108 based on specific muscle movements. In particular, the predetermined coded values can include specific character and/or numerical designations (e.g., binary code) that can be associated, but not limited to, a specific muscle that is moved, a degree of movement of the specific muscle, the type of movement of the specific muscle, the direction of movement of the specific muscle, the duration of the movement of the specific muscle, and the like. In other words, the storage unit 118 can include numerous predetermined codes values that can be associated to various types of muscle movements that occur within the driver's hand, wrist, and/or forearm when the driver provides one or more gestures.

In an exemplary embodiment, the signal reception module 134 can analyze the one or more EEG signals received from the EEG sensors 108 to convert the one or more EEG signals corresponding to specific muscle movements into one or more respective predetermined code values. In one embodiment, when receiving the one or more EEG signals, the signal reception module 134 can determine the one or more EEG signals that are received in a continuous manner based on one or more continuous muscle movements that are sensed in a continuous manner. In other words, the signal reception module 134 can determine EEG signals that are provided in a manner that signifies the continuous movement of one or more muscles in the driver's hand, wrist, and/or forearm that occur when the driver provides a gesture.

Upon receiving the one or more EEG signals, the signal reception module 134 can determine one or more predetermined coded values that correspond to the EEG signals received from the EEG sensors 108. The signal reception module 134 can further convert the one or more EEG signals pertaining to the one or more sensed muscle movements into one or more corresponding predetermined coded values based on the predetermined coded values stored within the storage unit 118. Therefore the one or more corresponding predetermined coded values can represent muscle movements that occur when the driver moves his or her finger and thumb to provide swiping, writing, guiding, turning, twirling gestures. Upon converting the EEG signals to the one or more corresponding predetermined coded values, the signal reception module 134 can send the one or more corresponding predetermined coded values to the gesture determinant module 136 to determine one or more gestures.

FIG. 3 is an illustrative example of executing gesture based control of the vehicle system. As the illustrative example of FIG. 3 shows, when the driver 302 performs a writing gesture to "write" in a navigation destination address 304 to the navigation system via a navigation system user interface 306 presented on the display unit 120, the driver 302 can use his index finger 308 to extend and point in different directions to "write" in each character of the navigation destination address 304. As shown the driver extends his or her index finger 308 at different degrees and moves his or her index finger 308 in various directions to provide the writing gesture to write in a letter "A" (as shown by the phantom lines and arrows indicating movement of the driver's index finger 308) as the driver's hand and wrist are contacting the gear shift knob. As the driver provides the gestures, the EEG sensors 108 can determine one or more EEG signals from the respective extender muscles located at the lower side of the driver's wrist that move in a specific manner based on when the driver's index finger 308 is extended. The one or more EEG signals can also be attributed to the manner in which the driver's index finger 308 is extended. The signal reception module 134 can receive the one or more EEG signals from the EEG sensors 108 that correspond to the extender muscle movements. Upon receipt of the one or more EEG signals, the signal reception module 134 can convert the one or more EEG signals pertaining to the sensed muscle movements into one or more corresponding predetermined coded values based on the predetermined coded values stored within the storage unit 118 that correspond to the movements and the manner of movement of the respective extender muscle. The signal reception module 134 can further send the one or more sets of corresponding predetermined coded values to the gesture determinant module 136.

With reference back to FIG. 1, in an exemplary embodiment, upon receipt of the one or more corresponding predetermined coded values, the gesture determinant module 136 can access the data store 128 and can perform a query on the gesture lookup table 130 to determine the plurality of gestural attribute values based on the predetermined coded values. More specifically, the gesture determinant module 136 can perform a query on the gesture lookup table 130 to determine records that include each of the one or more predetermined coded values that were received by the gesture determinant module 136. As discussed above, the gesture lookup table 130 can include records for a subset of predetermined coded values that include corresponding set of the plurality of gestural attribute values.

In particular, the plurality of gestural attribute values can include coded values (e.g., binary code) that can correspond to specific types of finger and/or thumb movements of the driver that are determined based on the one or more corresponding predetermined coded values (based on the one or more sensed EEG signals). Each of the gestural attribute values can represent a portion of a full gesture that is provided by the driver. Referring back to the illustrative example of FIG. 3, each gestural attribute value can include a coded value that corresponds to a partial movement of the driver's index finger 308 upon the driver extending his or her index finger 308 to perform the writing gesture. For instance, each gestural attribute can be attributed to a partial extension of the driver's index finger 308 and related attributes such as the direction of the extension of the driver's index finger 308, the degree of the extension of the driver's index finger 308, and the duration of the extension of the driver's index finger 308.

With reference again to FIG. 1, upon querying the gesture lookup table 130 for each of the one or more predetermined coded values received from the signal reception module 134, the gesture determinant module 136 can acquire the corresponding plurality of gestural attribute values. The gesture determinant module 136 can combine the plurality of gestural attribute values that correspond to each of the one or more predetermined coded values into a gesture code. In other words, the gesture determinant module 136 can acquire one or more sets of plurality of gestural attributes from the gesture lookup table 130 that correspond to the one or more predetermined coded values. The gesture determinant module 136 can then combine the plurality of gestural attribute values based (of the one or more sets) to form the gesture code.

As discussed each gesture performed by the driver includes a corresponding gesture code that can be utilized by the gesture control application 106 to identify the respective gesture provided by the driver of the vehicle 102. In other words, the gesture determinant module 136 determines the gesture provided by the driver based on the predetermined coded values that correspond to the plurality of EEG signals sensed by the EEG sensors 108 when the driver positions his hand, wrist, and/or forearm on the sensor pad 124 of the gear shift knob 110. In one or more embodiments, the gesture code can also correspond to one or more attributes of the driver's gesture including, but not limited to, the direction of the gesture, the duration of the gesture, and the orientation of the gesture, with respect to the display unit 120 and user interface presented on the display unit 120. Upon determining the gesture provided by the driver, the gesture determinant module 136 can provide the gesture code to the command determinant module 138.

Referring back to the illustrative example of FIG. 3, a plurality of gestural attribute values corresponding to the partial movement of the driver's index finger 308 upon the driver extending his or her index finger 308 to perform the writing gesture can be combined into a gesture value representative of the writing gesture. For instance, as shown, when the driver completes the writing gesture to "write" in the letter "A" to input the destination address via the navigation system user interface 306, the gesture value can be representative of such a writing gesture. Therefore, upon determining the gesture value that can be representative of such a writing gesture, the gesture determinant module 136 can send the gesture value to the command determinant module 138 to determine an interaction command based on the corresponding writing gesture.

Referring back to FIG. 1, in an exemplary embodiment, upon receipt of the gesture code, the command determinant module 138 can communicate with the ECU 104 and/or the head unit 116 to identify which vehicle system of the plurality of vehicle systems 114 is currently being utilized by the driver of the vehicle 102. In one embodiment, the ECU 104 and/or the head unit 116 can identify which vehicle system is currently being utilized by the driver of the vehicle 102 based on the respective user interface of the plurality of vehicle system user interfaces 122 that is being presented via the display unit 120. In other words, the ECU 104 and/or head unit 116 can identify a particular vehicle system as currently being utilized based on the respective user interface that is in focus based on the driver's utilization of the one or more user input devices (e.g., touch screen, turn knobs, etc.) within the vehicle 102. For example, if the driver utilizes the touch screen to present the navigation system user interface, the ECU 104 and/or the head unit 116 can identify the navigation system as the vehicle system that is currently being utilized.

In an alternate embodiment, the ECU 104 and/or the head unit 116 can identify which vehicle system is currently being utilized based on a last interaction provided by the driver with the respective vehicle system. In other words, the ECU 10 and/or the head unit 116 can identify a vehicle system as currently being utilized based the vehicle system receiving the driver's last physical interaction (e.g., manipulation of physical push buttons, knobs) last user interface input interaction, and/or last gestural interaction. For example, if the driver of the vehicle 102 last utilized turn knobs to change the volume of the audio system, the ECU 104 and/or the head unit 116 can identify the audio system as the vehicle system that is currently being utilized.

Upon identifying the vehicle system that is currently being utilized, the ECU 104 and/or the head unit 116 can provide respective data to the command determinant module 138. The command determinant module 138 can access the data store 128 and perform a query on the user interaction lookup table 132 to determine records that contain the respective vehicle system designation. More specifically, the command determinant module 138 can perform a query on the user interaction lookup table to determine records that include the designation of the identified vehicle system that is currently being utilized by the driver of the vehicle 102 to ensure that only relevant records are further queried to determine interaction commands. Therefore, only records with gesture codes and interaction commands that pertain to the vehicle system being utilized by the driver will be available to limit the commands that are to be determined by the command determinant module 138 to the identified vehicle system. This functionality can ensure that only interaction commands that apply to the vehicle system that is being utilized by the driver will be output by the gesture control application 106 and will be executed by the respective vehicle system. This functionality can also ensure that time and/or processing resources are not unnecessarily utilized to determine interaction commands to vehicle systems that are not being utilized by the driver based on gestures provided by the driver.

Upon determining records that indicate the identified vehicle system that is being utilized by the driver of the vehicle 102, the command determinant module 138 can further query the determined records (that include the identified vehicle system designation) to determine records that include the gesture code provided by the gesture determinant module 136 (that corresponds to the determined gesture provided by the driver). In an exemplary embodiment, the command determinant module 138 queries the user interaction lookup table 132 to determine if the one or more gestures provided by the driver, and received in the form of one or more gestures codes do in fact match up to predetermined gestures (that are included in the form of predetermined gesture codes within the user interaction lookup table 132) that are applicable to interact with the identified vehicle system to provide an interaction command. In other words, the command determinant module 138 determines if one or more records with the gesture codes received from the gesture determinant module 136 are found within the records that contain the designation of the identified vehicle system.

In one embodiment, upon querying the user interaction lookup table 132, if the command determinant module 138 determines that one or more records that include the designation of the identified vehicle system do not include the gesture code within the user interaction lookup table 132, the command determinant module 138 can send a corresponding signal to the command feedback module 142 of the gesture control application 106. Upon receipt of the signal, the command feedback module 142 can utilize the haptic feedback device(s) 126 disposed on the sensor pad 124 of the hand resting portion 202 to provide haptic (e.g., vibrational) feedback to the driver of the vehicle 102 that can inform the driver that the gesture(s) he or she has provided is not applicable to the vehicle system that is currently being utilized by the driver. For example, if the navigation system and navigation system user interface does not include any turn knobs/turn knob user inputs, a gesture code corresponding to a turning gesture provided by the driver will not match up to the predetermined gestures that are applicable to interact with the navigation system. The command determinant module 138 can send a corresponding signal to inform the driver via haptic feedback that the turning gesture is not applicable to the navigation system.

If the command determinant module 142 determines that a record containing the gesture code is found, it is determined that the gesture provided by the driver does match up to the predetermined gestures that are applicable to interact with the vehicle system that is currently being utilized by the driver of the vehicle 102. In an exemplary embodiment, each record of the user interaction lookup table 132 can include the interaction command that pertains to the identified vehicle system and that corresponds to the gesture code that is received by the command determinant module 138. Therefore, upon querying the user interaction lookup table 132, if the command determinant module 138 determines that a record containing the gesture code is found, the command determinant module 138 can acquire the corresponding interaction command that is included within the same record.

In an exemplary embodiment, the interaction command can include an execution command that can be interpreted and executed by the ECU 104 and/or the head unit 116 in order for the plurality of vehicle systems 114 to provide one or more respective features. In one embodiment, each interaction command can be associated to a type of interaction that can be executed by the respective identified vehicle system based on the gesture that is determined as being provided by the driver of the vehicle 102. In addition to being associated to the type of interaction that is to be executed by the identified vehicle system, in some instances, each interaction command included within each record of the user interaction lookup table 132 can also be associated to certain attributes that can include but are not limited to a direction of interaction and a degree of interaction that corresponds to the gesture code. For example, when the driver provides a turning gesture that simulates the turning of a turn knob to increase the volume of the audio system, the interaction command can include the turning gesture along with the turning direction and degree of the turn based on the gesture code that corresponds to the degree of movement of the driver's finger's when providing the turning gesture.

With respect again to the illustrative example shown in FIG. 3, when the driver provides the writing gesture to input the destination address to the navigation system, upon receiving the respective gesture code and determining that the respective gesture code is included within a record that includes the navigation system designation, the command determinant module 138 can query the user interaction lookup table 132 to determine the interaction command that is included within the record that includes the respective gesture code. In this case, the corresponding interaction command can include a command to the navigation system to input a character "A" to the text box that is provided on the navigation system user interface 306 that is based on the writing gesture provided by the driver 302 of the vehicle 102.

Referring again to FIG. 1, upon querying the user interaction lookup table 132 and determining the interaction command, the command determinant module 138 can send the interaction command to the command output module 140. Upon receipt of the interaction command, the command output module 140 can send the interaction command to the ECU 104 and/or the head unit 116 in order for the identified vehicle system that is currently being utilized by the driver to execute the interaction command.

In one embodiment, upon receiving the interaction command from the command output module 140, the ECU 104 and/or the head unit 116 can send an executable command to the plurality of vehicle systems 114 in order for the identified vehicle system currently being utilized by the driver to execute an interaction that corresponds to the interaction command. In other words, upon receipt of the interaction command, the ECU 104 and/or head unit 116 can send a respective command for the identified vehicle system currently being utilized to manipulate, adjust, input, and/or output one or more functions based on the gesture provided by the driver of the vehicle 102.

With reference again to the illustrative example of FIG. 3, upon receiving the interaction command to the navigation system to input the character "A" to the text box, the ECU 104 and/or the head unit 116 can send an execution command to the navigation system to execute a corresponding identified function that includes inputting of a corresponding letter "A", as shown within a destination input text box of the navigation system user interface 306 that is based on the writing gesture provided by the driver of the vehicle 102.

Referring again to FIG. 1, in an exemplary embodiment, upon the identified vehicle system manipulating, adjusting, inputting, and/or outputting the interaction based on the interaction command received by the ECU 104 and/or the head unit 116, the ECU 104 and/or the head unit 116 can send a confirmation signal to the command feedback module 142 of the gesture control application 106. The confirmation signal can signify that the interaction command was successfully executed by the vehicle system that is being utilized by the driver of the vehicle 102.

In one or more embodiments, upon receiving the conformation signal, the command feedback module 142 can utilize the haptic feedback device(s) 126 disposed on the sensor pad 124 to provide haptic feedback to the driver of the vehicle 102. In one embodiment, the haptic feedback can include one or more vibrations that can felt by the driver to indicate to the driver that the interaction command based on the gesture provided by the driver has been successfully executed by the vehicle system. In an additional embodiment, the haptic feedback can include force feedback that can provide the driver with one or more feedback sensations that are consistent with manipulating a virtual object (e.g., a user interface icon/button, a user interface turn knob, a writing instrument, etc.) that the driver feels as the driver positions his or her hand, wrist, and/or forearm on the hand resting portion 202 of the gear shift knob 110.

III. Exemplary Methods Utilized by the Gesture Control Application

Figure 4:
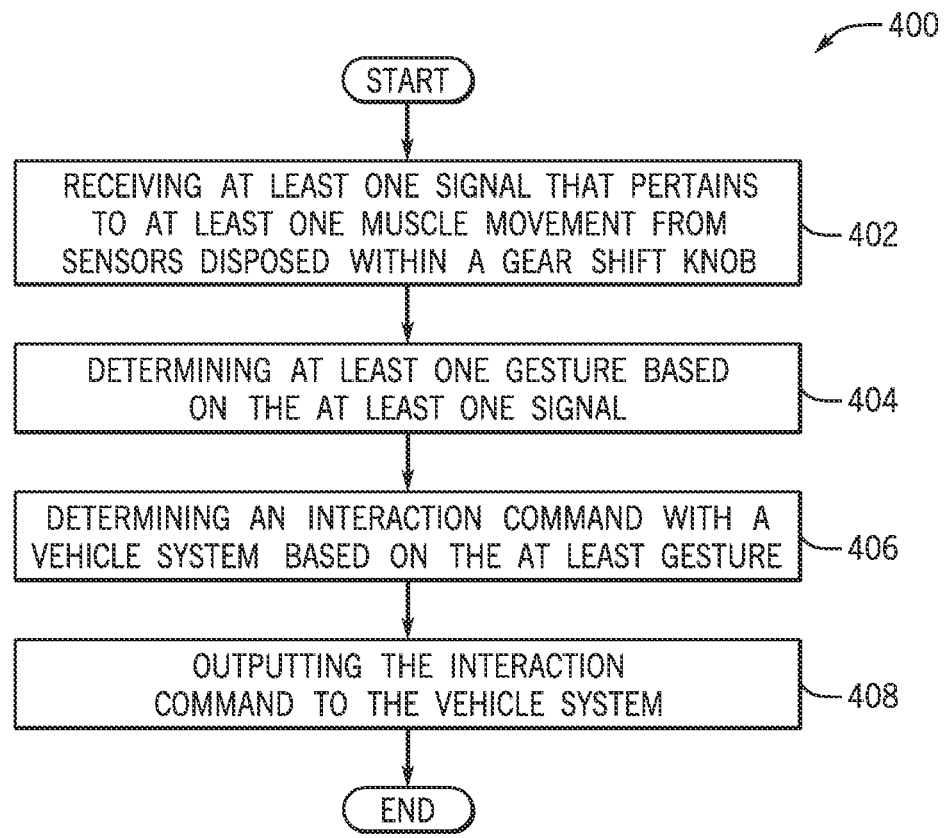
FIG. 4 is a process flow diagram of a method for executing gesture based control of a vehicle system executed by a gesture control application from the operating environment of FIG. 1 according to an exemplary embodiment.

FIG. 4 is a process flow diagram of a method 400 for executing gesture based control of a vehicle system executed by the gesture control application 106 from the operating environment of FIG. 1 according to an exemplary embodiment. FIG. 4 will be described with reference to the components of FIGS. 1 and 2, though it is to be appreciated that the method 400 of FIG. 4 can be used with additional and/or alternative system components. At block 402, the method includes receiving at least one signal that pertains to at least one muscle movement from sensors disposed within a gear shift knob.

Figure 5:
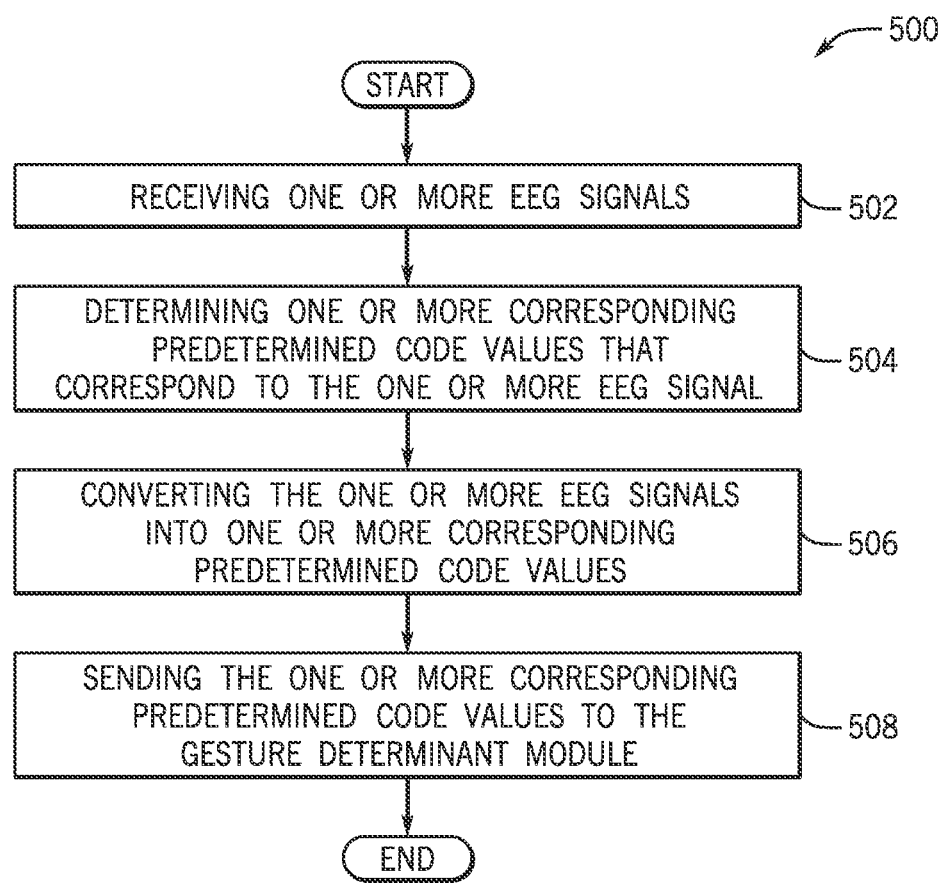
FIG. 5 is a process flow diagram of a method for receiving at least one signal that pertains to at least one muscle movement from sensors disposed within a gear shift knob from the operating environment of FIG. 1 according to an exemplary embodiment.

FIG. 5 is a process flow diagram of a method 500 for receiving at least one signal that pertains to at least one muscle movement from sensors disposed within a gear shift knob 110 from the operating environment of FIG. 1 according to an exemplary embodiment. At block 502, the method includes receiving one or more EEG signals. Upon the driver positioning his or her hand, wrist, and/or forearm on the gear shift knob 110 of the shift lever 112, the EEG sensors 108 disposed on the sensor pad 124 can output EEG signals based on sensed electrical activity associated with the muscles within the driver's hand, wrist, and/or forearm. The signal reception module 134 can receive one or more EEG signals from the EEG sensors 108 that correspond to the muscle movements that occur within the driver's hand, wrist, and/or forearm when the driver provides one or more gestures to interact with a respective vehicle system.

At block 504, the method includes determining one or more corresponding predetermined code values that correspond to one or more EEG signals. In one embodiment, upon receiving the one or more EEG signals (at block 502) the signal reception module 134 can analyze the one or more EEG signals received from the EEG sensors 108 to determine respective predetermined code values that are based on predetermined code values stored on the storage unit 118.

At block 506, the method includes converting the one or more EEG signals into one or more corresponding predetermined code values. In one embodiment, upon the signal reception module 134 determining one or more predetermined coded values that correspond to the EEG signals received from the EEG sensors 108 (at block 504), the signal reception module 134 can convert the EEG signals pertaining to the sensed muscle movements into one or more corresponding predetermined coded values based on the predetermined coded values stored within the storage unit 118. Therefore the one or more corresponding predetermined coded values can represent muscle movements that are sensed when the driver moves his or her finger and thumb to provide gestures.

At block 508, the method includes sending the one or more corresponding predetermined code values to the gesture determinant module 136. Upon converting the EEG signals to the corresponding sets of predetermined coded values, the signal reception module 134 can send the corresponding predetermined coded values to the gesture determinant module 136 to determine one or more gestures.

Figure 6:
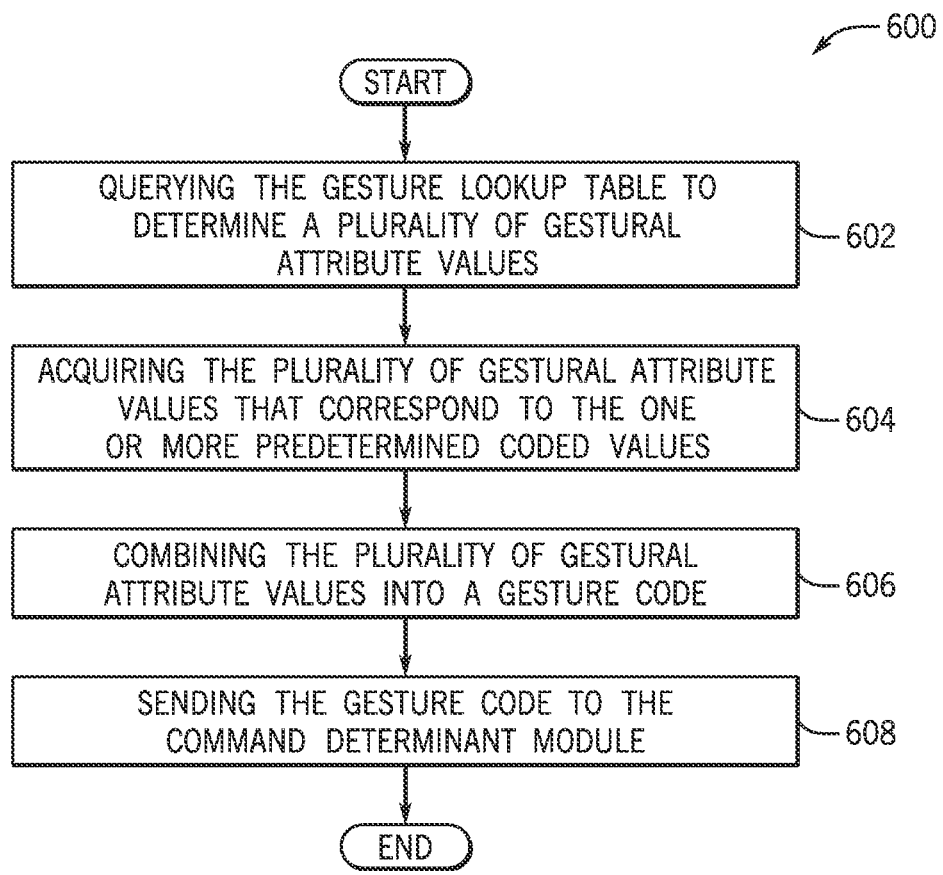
FIG. 6 is a process flow diagram of a method for determining at least one gesture based on the at least one signal from the operating environment of FIG. 1 according to an exemplary embodiment.

Referring again to FIG. 4, upon receiving at least one signal (at block 402), at block 404, the method includes determining at least one gesture based on the at least one signal. FIG. 6 is a process flow diagram of a method 600 for determining at least one gesture based on the at least one signal from the operating environment of FIG. 1 according to an exemplary embodiment. At block 602, the method includes querying the gesture lookup table 130 to determine a plurality of gestural attribute values. In one embodiment, upon receiving the one or more corresponding predetermined code values from the signal reception module 134 (based on block 508 of FIG. 5), the gesture determinant module 136 can perform a query on the gesture lookup table 130 to determine records that include each of the predetermined coded values that were sent to the gesture determinant module 136.

At block 604, the method includes acquiring the plurality of gestural attribute values that correspond to the one or more predetermined coded values. Upon querying the gesture lookup table 130 for each of the predetermined coded values received from the signal reception module 134, the gesture determinant module 136 can acquire the corresponding plurality of gestural attribute values.

At block 606, the method includes combining the plurality of gestural attribute values into a gesture code. Upon acquiring the plurality of gestural attribute values, the gesture lookup table 130 and can combine them within a sequence to form a gesture code that corresponds to the gesture provided by the driver as the driver positions his hand, wrist, and/or forearm on the gear shift knob 110 of the shift lever 112. The gesture code (i.e., gesture provided by the driver) can possibly match up to one or more predetermined gestures that can be utilized to interact with one or more of the plurality of vehicle systems 114. At block 608, the method includes sending the gesture code to the command determinant module 138. Upon determining the gesture provided by the driver, the gesture determinant module 136 can provide the gesture code to the command determinant module 138.

Figure 7:
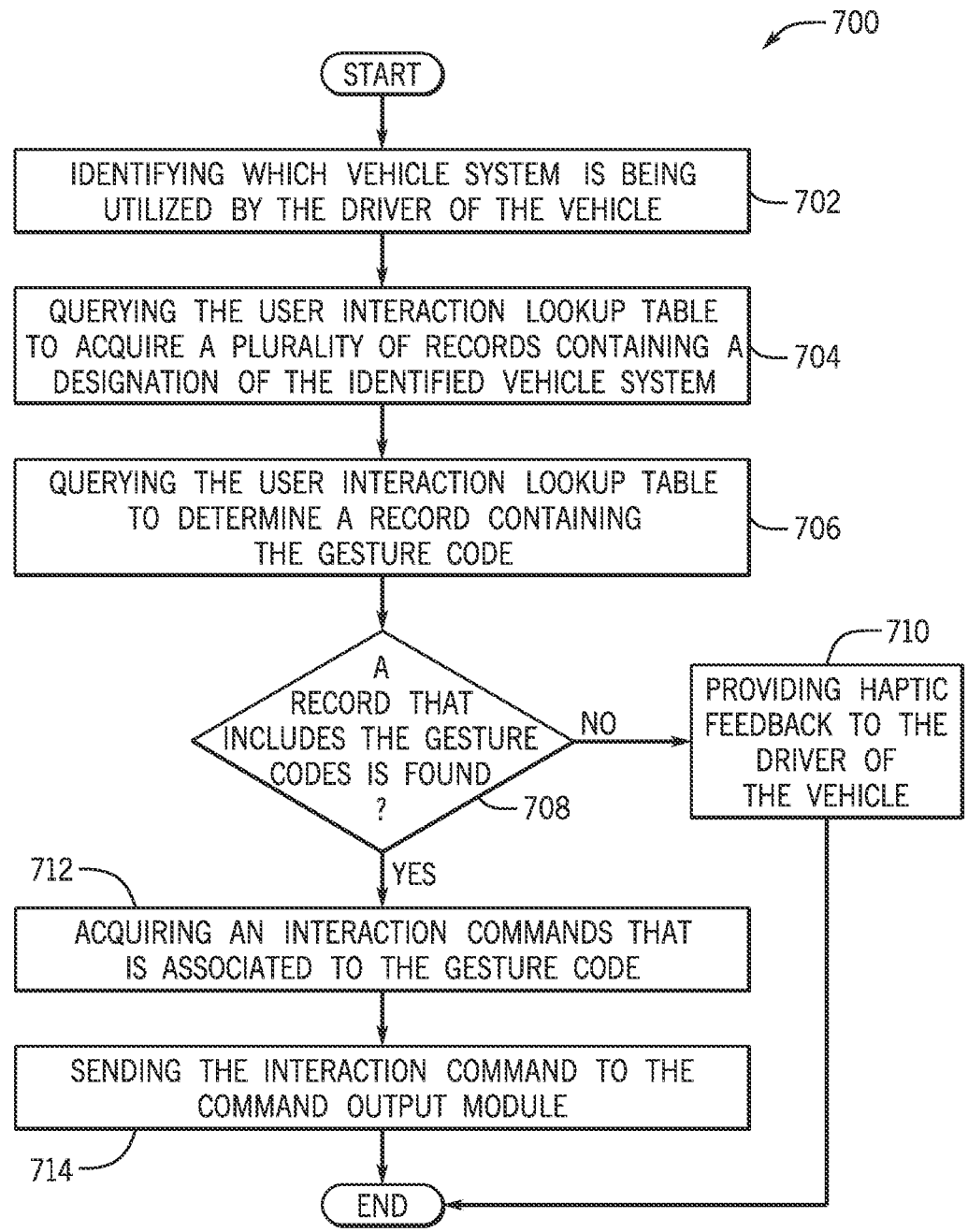
FIG. 7 is a process flow diagram of a method for determining an interaction command with a vehicle system based on the at least one gesture from the operating environment of FIG. 1 according to an exemplary embodiment.

Referring again to FIG. 4, upon determining at least one gesture (at block 404), at block 406, the method includes determining an interaction command with a vehicle system based on the at least one gesture. FIG. 7 is a process flow diagram of a method 700 for determining an interaction command with a vehicle system based on the at least one gesture from the operating environment of FIG. 1 according to an exemplary embodiment. At block 702, the method includes identifying which vehicle system is being utilized by the driver of the vehicle 102. In an exemplary embodiment, upon receipt of the gesture code, the command determinant module 138 can communicate with the ECU 104 and/or the head unit 116 to identify which vehicle system of the plurality of vehicle systems 114 is being utilized by the driver of the vehicle 102.

In one embodiment, the ECU 104 and/or the head unit 116 can identify which vehicle system is being utilized by the driver of the vehicle 102 based on the respective user interface of the plurality of vehicle system user interfaces 122 that is being presented via the display unit. In an alternate embodiment, the ECU 104 and/or the head unit 116 can identify which vehicle system is being utilized based on a last interaction provided by the driver with the respective vehicle system. Upon identifying the vehicle system that is currently being utilized, the ECU 104 and/or the head unit 116 can provide data identifying the vehicle system that is being utilized by the driver to the command determinant module 138.

At block 704, the method includes querying the user interaction lookup table 132 to acquire a plurality of records containing a designation of the identified vehicle system. In one embodiment, upon receiving the data identifying the vehicle system that is being utilized by the driver, the command determinant module 138 can access the data store 128 and perform a query on the user interaction lookup table 132 to determine a plurality of records that contain the designation of the identified vehicle system. At block 706, the method includes querying the user interaction lookup table 132 to determine a record containing the gesture code. Upon determining the plurality of records that contain the designation of the identified vehicle system (i.e., that indicate the identified vehicle system that is being currently utilized by the driver of the vehicle 102), the command determinant module 138 can further query the determined records (that include the identified vehicle system designation) to determine a record that includes the gesture code provided by the gesture determinant module 136 (that corresponds to the determined gesture provided by the driver as the driver positions his or her hand, wrist, and/or forearm on the hand resting portion 202 of the gear shift knob 110).

At block 708, the method includes determining if a record that includes the gesture code is found. In an exemplary embodiment, the command determinant module 138 queries the user interaction lookup table 132 to determine if the gesture provided by the driver, and received in the form of the gestures code does in fact match up to predetermined gestures that are applicable to interact with the identified vehicle system to provide an interaction command. In other words, the command determinant module 138 determines if a record containing the gesture code received from the gesture determinant module 136 is found within the plurality of records containing the designation of the identified vehicle system.

If it is determined that a record that includes the gesture code is not found (at block 708), at block 710, the method includes providing haptic feedback to the driver of the vehicle 102. In one embodiment, upon determining that a record that includes the gesture code is not found, the command determinant module 138 can send a corresponding signal to the command feedback module 142 of the gesture control application 106. Upon receipt of the signal, the command feedback module 142 can utilize the haptic feedback device(s) 126 disposed on the sensor pad 124 of the hand resting portion 202 to provide haptic (e.g., vibrational) feedback to the driver of the vehicle 102 that can inform the driver that the gesture(s) he or she has provided is not applicable to the vehicle system that is currently being utilized by the driver.

If it is determined that a record that includes the gesture code is found (at block 708), at block 712, the method includes acquiring an interaction command that is associated to the gesture code. In an exemplary embodiment, the command determinant module 138 can acquire the interaction command from the record that includes the gesture code that was determined to be found (at block 708). As discussed above, the interaction command can include an execution command that can be interpreted and executed by the ECU 104 and/or the head unit 116 in order for the plurality of vehicle systems 114 to provide one or more respective features. At block 714, the method includes sending the interaction command to the command output module 140. Upon querying the user interaction lookup table 132 and acquiring the interaction command, the command determinant module 138 can send the interaction command to the command output module 140.

Referring again to FIG. 4, upon determining an interaction command (at block 406), at block 408, the method includes outputting the interaction command to the vehicle system. Upon receipt of the interaction command from the command determinant module 138, the command output module 140 can send the interaction command to the ECU 104 and/or the head unit 116 in order for the identified vehicle system being utilized by the driver to execute the interaction command. In one embodiment, upon receiving the interaction command from the command output module 140, the ECU 104 and/or the head unit 116 can send one or more respective executable commands to the plurality of vehicle systems 114 in order for the identified vehicle system being utilized by the driver to execute one or more interactions that correspond to the interaction command that is based on the gesture provided by the driver as his or her hand, wrist, and/or forearm is positioned on the hand resting portion 202 of the gear shift knob 110. In other words, the driver can manipulate, adjust, input, and/or output one or more functions based on the gesture provided by the driver of the vehicle 102.

In some embodiments, upon the identified vehicle system executing the interaction command, the ECU 104 and/or the head unit 116 can send the confirmation signal to the command feedback module 142 of the gesture control application 106. The confirmation signal can signify that the interaction command was successfully executed by the vehicle system that is being utilized by the driver of the vehicle 102.

In one or more embodiments, upon receiving the conformation signal, the command feedback module 142 can utilize the haptic feedback device(s) 126 disposed on the sensor pad 124 to provide a haptic feedback to the driver of the vehicle 102 to indicate to the driver that the interaction command based on the gesture provided by the driver is being of has been successfully executed by the vehicle system that is being utilized by the driver of the vehicle 102.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also indented to be encompassed by the following claims.

The invention claimed is:

1. A computer-implemented method for executing gesture based control of a vehicle system, comprising:
   receiving a plurality of signals that pertain to a plurality of muscle movements from a plurality of electromyography (EEG) sensors disposed within a gear shift knob, wherein receiving the plurality of signals includes analyzing each of the plurality of signals and determining a predetermined code value that corresponds to each of the plurality of signals;
   determining at least one gesture based on the plurality of signals, wherein determining the at least one gesture includes acquiring a plurality of gestural attribute values that correspond to the predetermined code value, wherein determining the at least one gesture further includes combining the plurality of gestural attribute values that correspond with the predetermined code value into a gesture code;
   determining an interaction command with at least one vehicle system that is currently being utilized based on the at least one gesture, wherein the at least one vehicle system is identified as currently being utilized based on a vehicle system user interface associated with the at least one vehicle system that is being presented based on a user input, wherein a first haptic feedback is provided through the gear shift knob when the interaction command is not determined based on the at least one gesture; and
   outputting the interaction command to the at least one vehicle system, wherein the interaction command is outputted to control the at least one vehicle system to execute the interaction command, wherein a second haptic feedback is provided to indicate at least one of: the at least one vehicle system is executing the interaction command based on the gesture, and the at least one vehicle system has executed the interaction command based on the gesture.

2. The computer-implemented method of claim 1, wherein receiving the plurality of signals includes disposing the plurality of EEG sensors on the gear shift knob to sense the plurality of muscle movements from at least one of: a hand, a wrist, and a forearm that is positioned on a hand rest portion of the gear shift knob.

3. The computer-implemented method of claim 1, predetermined code value is associated to at least one of: a specific muscle that is moved, a degree of movement of the specific muscle, a type of movement of the specific muscle, a direction of movement of the specific muscle, and a duration of the movement of the specific muscle.

4. The computer-implemented method of claim 3, wherein acquiring the plurality of gestural attribute values includes providing a query on a first data table to determine a record that includes the predetermined code value and acquiring the plurality of gestural attribute values, wherein each of the plurality of gestural attribute values is associated to at least one of: a specific type of hand movement, a specific type of finger movement, and a specific type of thumb movement that represents a portion of a full gesture that is provided.

5. The computer-implemented method of claim 4, wherein the gesture code corresponds to at least one of: a type of gesture, a direction of the gesture, a duration of the gesture, and an orientation of the gesture.

6. The computer-implemented method of claim 5, wherein determining the interaction command includes providing a query on a second data table to acquire a plurality of records containing a designation of the at least one vehicle system.

7. The computer-implemented method of claim 6, wherein determining the interaction command includes providing a query on the plurality of records of the second data table containing the designation of the at least one vehicle system to determine a record that contains the gesture code and acquiring the interaction command that is associated to the gesture code.

8. The computer-implemented method of claim 1, wherein the second haptic feedback is provided when a confirmation signal is received from the vehicle system, wherein the second haptic feedback includes at least one of: vibrational feedback, or force feedback.

9. A system for executing gesture based control of a vehicle system comprising:
a non-transitory memory storing instructions when executed by a processor causes the processor to:
receive a plurality of signals that pertain to a plurality of muscle movements from a plurality of electromyography (EEG) sensors disposed within a gear shift knob, wherein receiving the plurality of signals includes analyzing each of the plurality of signals and determining a predetermined code value that corresponds to each of the plurality of signals;
determine at least one gesture based on the plurality of signals, wherein determining the at least one gesture includes acquiring a plurality of gestural attribute values that correspond to the predetermined code value, wherein determining the at least one gesture further includes combining the plurality of gestural attribute values that correspond with the predetermined code value into a gesture code;
determine an interaction command with at least one vehicle system that is currently being utilized based on the at least one gesture, wherein the at least one vehicle system is identified as currently being utilized based on a vehicle system user interface associated with the at least one vehicle system that is being presented based on a user input, wherein a first haptic feedback is provided through the gear shift knob when the interaction command is not determined based on the at least one gesture; and
output the interaction command to the at least one vehicle system, wherein the interaction command is outputted to control the at least one vehicle system to execute the interaction command, wherein a second haptic feedback is provided to indicate at least one of: the at least one vehicle system is executing the interaction command based on the gesture, and the at least one vehicle system has executed the interaction command based on the gesture.

10. The system of claim 9, wherein the plurality of EEG sensors are disposed on the gear shift knob to sense the plurality of muscle movements from at least one of: a hand, a wrist, and a forearm that is positioned on a hand rest portion of the gear shift knob.

11. The system of claim 10, wherein the predetermined code value is associated to at least one of: a specific muscle that is moved, a degree of movement of the specific muscle, a type of movement of the specific muscle, a direction of movement of the specific muscle, and a duration of the movement of the specific muscle.

12. The system of claim 11, wherein a query is provided on a first data table to determine a record that includes the predetermined code value and the plurality of gestural attribute values is acquired, wherein each of the plurality of gestural attribute values is associated to at least one of: a specific type of hand movement, a specific type of finger movement, and a specific type of thumb movement that represents a portion of a full gesture that is provided.

13. The system of claim 12, wherein the gesture code corresponds to at least one of: a type of gesture, a direction of the gesture, a duration of the gesture, and an orientation of the gesture.

14. The system of claim 13, wherein wherein a query is provided on a second data table to acquire a plurality of records containing a designation of the at least one vehicle system.

15. The system of claim 14, wherein determining the interaction command includes providing a query on the plurality of records of the second data table containing the designation of the at least one vehicle system to determine a record that contains the gesture code, wherein the interaction command that is associated to the gesture code is acquired.

16. The system of claim 9, further including wherein the second haptic feedback is provided when a confirmatory signal is received, wherein the second haptic feedback includes at least one of: vibrational feedback, or force feedback.

17. A non-transitory computer-readable storage medium storing instructions that when executed by a processor of a computer, causes the processor of the computer to implement a method, comprising:
receiving a plurality of signals that pertain to a plurality of muscle movements from a plurality of electromyography (EEG) sensors disposed within a gear shift knob, wherein receiving the plurality of signals includes analyzing each of the plurality of signals and determining a predetermined code value that corresponds to each of the plurality of signals;

determining at least one gesture based on the plurality of signals, wherein determining the at least one gesture includes acquiring a plurality of gestural attribute values that correspond to the predetermined code value, wherein determining the at least one gesture further includes combining the plurality of gestural attribute values that correspond with the predetermined code value into a gesture code;

determining an interaction command with at least one vehicle system that is currently being utilized based on the at least one gesture, wherein the at least one vehicle system is identified as currently being utilized based on a vehicle system user interface associated with the at least one vehicle system that is being presented based on a user input, wherein a first haptic feedback is provided through the gear shift knob when the interaction command is not determined based on the at least one gesture; and outputting the interaction command to the at least one vehicle system, wherein the interaction command is outputted to control the at least one vehicle system to execute the interaction command, wherein a second haptic feedback is provided to indicate at least one of: the at least one vehicle system is executing the interaction command based on the gesture, and the at least one vehicle system has executed the interaction command based on the gesture.

18. The non-transitory computer-readable storage medium of claim 17, wherein acquiring the plurality of gestural attribute values includes providing a query on a first data table to determine a record that includes the predetermined code value and acquiring the plurality of gestural attribute values, wherein each of the plurality of gestural attribute values is associated to at least one of: a specific type of hand movement, a specific type of finger movement, and a specific type of thumb movement that represents a portion of a full gesture that is provided.

19. The non-transitory computer-readable storage medium of claim 18, wherein the gesture code corresponds to at least one of: a type of gesture, a direction of the gesture, a duration of the gesture, and an orientation of the gesture.

20. The non-transitory computer-readable storage medium of claim 19, wherein determining the interaction command includes providing a query on the plurality of records of a second data table containing a designation of the at least one vehicle system that is currently being utilized to determine a record that contains the gesture code and acquiring the interaction command that is associated to the gesture code, wherein the interaction command is provided to the at least one vehicle system.

* * * * *